United States Patent
Burnett et al.

(10) Patent No.: US 9,657,816 B2
(45) Date of Patent: May 23, 2017

(54) DRIVE LINK FOR TILTROTOR ROTOR SYSTEM

(71) Applicant: Bell Helicopter Textron Inc., Fort Worth, TX (US)

(72) Inventors: Michael Burnett, Fort Worth, TX (US); Christopher Foskey, Keller, TX (US); Joel McIntyre, Southlake, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 493 days.

(21) Appl. No.: 14/069,425

(22) Filed: Nov. 1, 2013

(65) Prior Publication Data

US 2015/0122953 A1     May 7, 2015

(51) Int. Cl.
| | |
|---|---|
| *B64C 27/32* | (2006.01) |
| *F16H 21/00* | (2006.01) |
| *B64C 27/33* | (2006.01) |
| *B64C 27/35* | (2006.01) |
| *F16D 3/62* | (2006.01) |
| *F16F 1/387* | (2006.01) |
| *F16F 1/393* | (2006.01) |
| *B64C 27/22* | (2006.01) |
| *F16C 19/30* | (2006.01) |
| *F16C 27/06* | (2006.01) |
| *B64C 29/00* | (2006.01) |

(52) U.S. Cl.
CPC ............. *F16H 21/00* (2013.01); *B64C 27/22* (2013.01); *B64C 27/33* (2013.01); *B64C 27/35* (2013.01); *B64C 29/0033* (2013.01); *F16C 19/30* (2013.01); *F16C 27/063* (2013.01); *F16D 3/62* (2013.01); *F16F 1/387* (2013.01); *F16F 1/393* (2013.01); *Y10T 74/20006* (2015.01)

(58) Field of Classification Search
CPC ......... B64C 27/22; B64C 27/32; B64C 27/33; B64C 27/35; B64C 29/0033
See application file for complete search history.

(56) References Cited

U.S. PATENT DOCUMENTS

| | | | |
|---|---|---|---|
| 4,804,352 A | * | 2/1989 | Schmidt .................. B64C 27/41 384/221 |
| 4,986,735 A | | 1/1991 | Robinson |
| 5,186,686 A | * | 2/1993 | Staples .................. B64C 27/35 464/69 |

(Continued)

FOREIGN PATENT DOCUMENTS

| | | |
|---|---|---|
| EP | 0306027 A2 | 3/1989 |
| WO | 2010/082936 A1 | 7/2010 |

OTHER PUBLICATIONS

European Search Report in related European Application No. 14150195.7, dated May 19, 2014, 3 pages.

(Continued)

*Primary Examiner* — Tien Dinh
*Assistant Examiner* — Michael A Fabula (57) ABSTRACT

A drive link includes a first bearing housing, a second bearing housing, and a central portion coupled between the first bearing housing and the second bearing housing. The central portion includes a central radial bearing configured such that the central portion twists in response to cocking of the first bearing housing relative to the second bearing housing.

18 Claims, 10 Drawing Sheets

(56) References Cited

U.S. PATENT DOCUMENTS

| | | | |
|---|---|---|---|
| 5,358,381 A | 10/1994 | Covington et al. | |
| 6,296,444 B1* | 10/2001 | Schellhase | B64C 27/32 |
| | | | 416/134 A |
| 7,896,747 B2 | 3/2011 | Russell | |
| 2003/0223871 A1 | 12/2003 | Schmaling et al. | |
| 2008/0023586 A1* | 1/2008 | Russell | F16C 7/04 |
| | | | 244/131 |
| 2008/0267778 A1* | 10/2008 | Stamps | B64C 27/32 |
| | | | 6/148 |
| 2009/0325718 A1* | 12/2009 | Stamps | B64C 27/14 |
| | | | 464/138 |
| 2013/0168492 A1* | 7/2013 | Biser | F16C 7/06 |
| | | | 244/17.25 |
| 2014/0270610 A1* | 9/2014 | Schofield | B64C 27/41 |
| | | | 384/220 |
| 2014/0274427 A1* | 9/2014 | Foskey | F16D 3/60 |
| | | | 464/147 |
| 2014/0322010 A1* | 10/2014 | Rauber | B64C 27/32 |
| | | | 416/1 |

OTHER PUBLICATIONS

Official Action in related European Application No. 14150195.7, dated Jun. 3, 2014, 6 pages.
Communication in related European Application No. 14150195.7, dated May 20, 2015, 4 pages.
Examination Report in related European Application No. 14150195.7, dated Dec. 3, 2015, 5 pages.
Communication Under Rule 71(3) EPC in related European Patent Application No. 14150195.7, dated Nov. 23, 2015, 31 pages.

* cited by examiner

DRIVE LINK FOR TILTROTOR ROTOR SYSTEM

TECHNICAL FIELD

This invention relates generally to tiltrotor aircraft, and more particularly, to a drive link for a tiltrotor rotor system.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

SUMMARY

Particular embodiments of the present disclosure may provide one or more technical advantages. A technical advantage of one embodiment may include the capability to provide drive links that improve flapping performance. A technical advantage of one embodiment may include the capability to improve drive link performance by decoupling the cocking and torsion motions.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
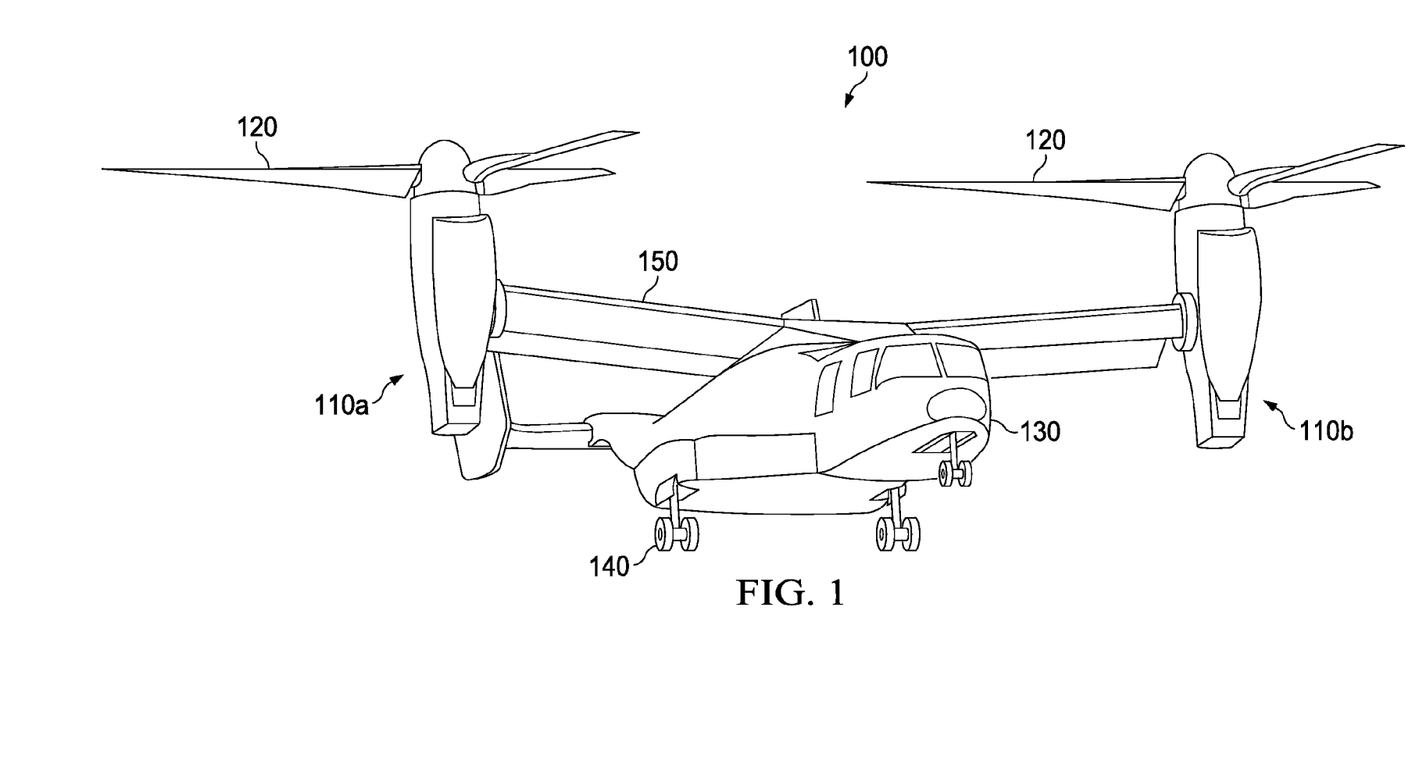
FIG. 1 shows a tiltrotor aircraft according to one example embodiment.

FIG. 1 shows a rotorcraft 100 according to one example embodiment. Rotorcraft 100 features rotor systems 110a and 110b, blades 120, a fuselage 130, a landing gear 140, and a wing 150.

Rotor system 110 may rotate blades 120. Rotor system 110 may include a control system for selectively controlling the pitch of each blade 120 in order to selectively control direction, thrust, and lift of rotorcraft 100. In the example of FIG. 1, rotorcraft 100 represents a tiltrotor aircraft, and rotor systems 110a and 110b feature rotatable nacelles. In this example, the position of nacelles 110a and 110b, as well as the pitch of rotor blades 120, can be selectively controlled in order to selectively control direction, thrust, and lift of tiltrotor aircraft 100.

Fuselage 130 represents the main body of rotorcraft 100 and may be coupled to rotor system 110 (e.g., via wing 150) such that rotor system 110 and blades 120 may move fuselage 130 through the air. Landing gear 140 supports rotorcraft 100 when rotorcraft 100 is landing and/or when rotorcraft 100 is at rest on the ground.

Teachings of certain embodiments relating to rotor systems described herein may apply to rotor system 110 and/or other rotor systems, such as non-tilting rotor and helicopter rotor systems. It should also be appreciated that teachings from rotorcraft 100 may apply to aircraft other than rotorcraft, such as airplanes and unmanned aircraft, to name a few examples.

In the example of FIG. 1, tiltrotor aircraft 100 may operate in a helicopter mode by tilting the nacelles upright and in an airplane mode by tilting the nacelles forward. Tiltrotor aircraft 100 may generate greater forward speed in airplane mode than in helicopter mode because, in airplane mode, blades 120 are oriented to generate greater thrust propelling the aircraft forward (somewhat analogous to a propeller).

Figure 2:
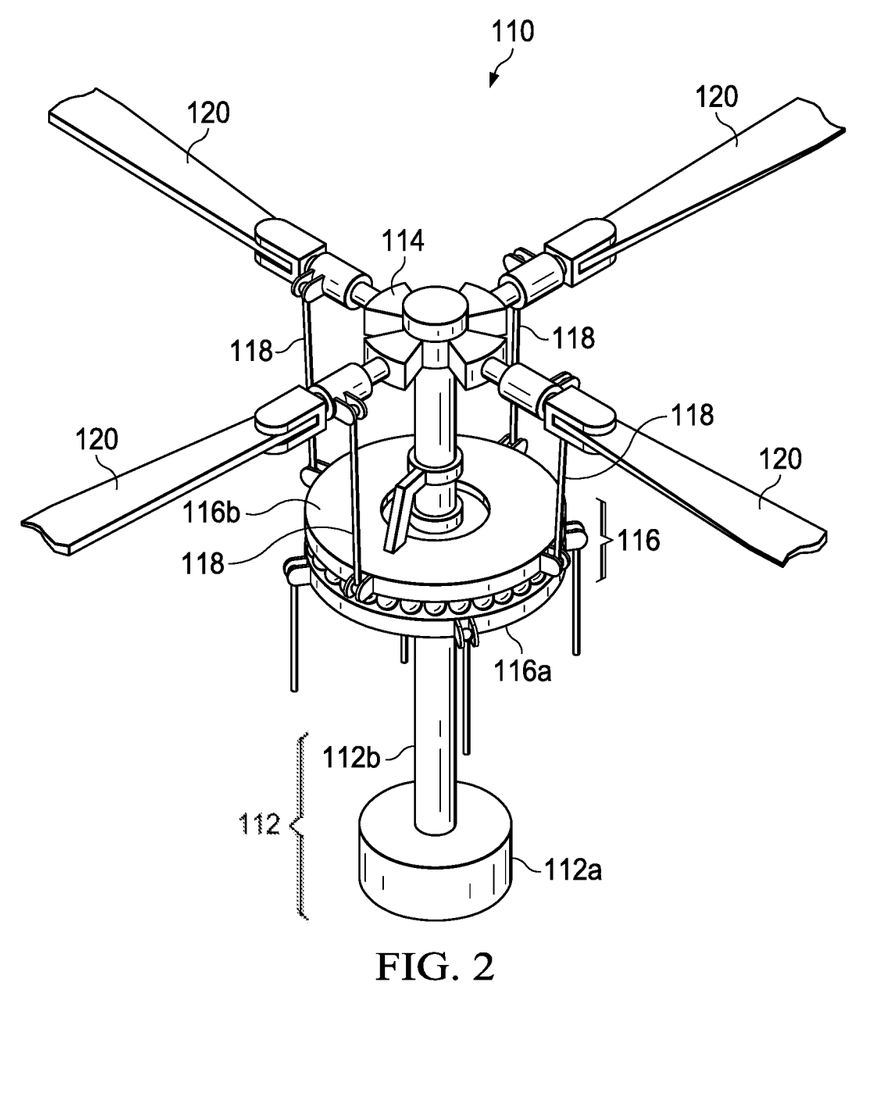
FIG. 2 shows a simplified example of a rotor system that may be incorporated in whole or in part in the rotorcraft of FIG. 1.

FIG. 2 shows a simplified example of a rotor system 110 that may be incorporated in whole or in part in the rotorcraft 100 of FIG. 1. In the example of FIG. 2, rotor system 110 features a power train 112, a yoke 114, a swashplate 116, and pitch links 118. In some examples, rotor system 110 may include more or fewer components. For example, FIG. 2 does not show components such as a gearbox, drive links, drive levers, tilting devices, and other components that may be incorporated.

Power train 112 features a power source 112a and a drive shaft 112b. Power source 112a, drive shaft 112b, and yoke 114 are mechanical components for transmitting torque and/or rotation. Power train 112 may include a variety of components, including an engine, a transmission, and differentials. In operation, drive shaft 112b receives torque or rotational energy from power source 112a and rotates yoke 114. Rotation of rotor yoke 114 causes blades 120 to rotate about drive shaft 112b. In some embodiments, power train 112 may include more or fewer components. For example, in some embodiments, tilting devices may be provided in mechanical communication with power train 112 that allows certain components of rotor system 110 to tilt between helicopter mode and airplane mode.

Swashplate 116 translates rotorcraft flight control input into motion of blades 120. Because blades 120 are typically spinning when the rotorcraft is in flight, swashplate 116 may transmit flight control input from the non-rotating fuselage to the yoke 114, blades 120, and/or components coupling yoke 114 to blades 120 (e.g., grips and pitch horns). References in this description to coupling between a pitch link and a yoke may also include, but are not limited to, coupling between a pitch link and a blade or components coupling a yoke to a blade.

In some examples, swashplate 116 may include a non-rotating swashplate ring 116a and a rotating swashplate ring 116b. Non-rotating swashplate ring 116a does not rotate with drive shaft 112b, whereas rotating swashplate ring 116b does rotate with drive shaft 112b. In the example of FIG. 2, pitch links 118 connect rotating swashplate ring 116b to blades 120.

In operation, according to one example embodiment, translating the non-rotating swashplate ring 116a along the axis of drive shaft 112b causes the pitch links 118 to move up or down. This changes the pitch angle of all blades 120 equally, increasing or decreasing the thrust of the rotor and causing the aircraft to ascend or descend. Tilting the non-rotating swashplate ring 116a causes the rotating swashplate 116b to tilt, moving the pitch links 118 up and down cyclically as they rotate with the drive shaft. This tilts the thrust vector of the rotor, causing rotorcraft 100 to translate horizontally following the direction the swashplate is tilted.

During operation, rotor system 110 may be subject to a variety of forces. As one example, the weight of blades 120 and the lift of blades 120 may result in transverse forces on yoke 114 and other components. Two examples of transverse forces may include forces resulting from flapping and coning of blades 120. Flapping may generally refer to the up-and-down movement of a rotor blade positioned at a right angle to the plane of rotation. Coning may generally refer to the upward flexing of a rotor blade due to lift forces acting on the rotor blade.

As another example, rotor system 110 may be subject to other forces, such as axial, lead/lag, and feathering forces. Axial forces may general refer to forces on rotor system 110 resulting from the centrifugal force on the rotor blades during rotation of the rotor blades. Lead and lag forces may generally refer to forces resulting from the horizontal movement of rotor blades about a vertical pin. Lead and lag forces may occur, for example, if blades 120 do not rotate faster or slower than the rotation of yoke 114. Feathering forces may generally refer to forces resulting from twisting motions that cause a rotor blade to change pitch.

Such forces may cause damage to rotor system 110 during operation if, for example, the magnitude of the forces is too high or the motions causing such forces occur too frequently. For example, damage may occur as the result of rotor flapping relative to the mast. Accordingly, teachings of certain embodiments recognize the capability to provide drive links that may transfer torque from the mast to the rotor blades while still allowing at least some rotor system flapping.

Figure 3:
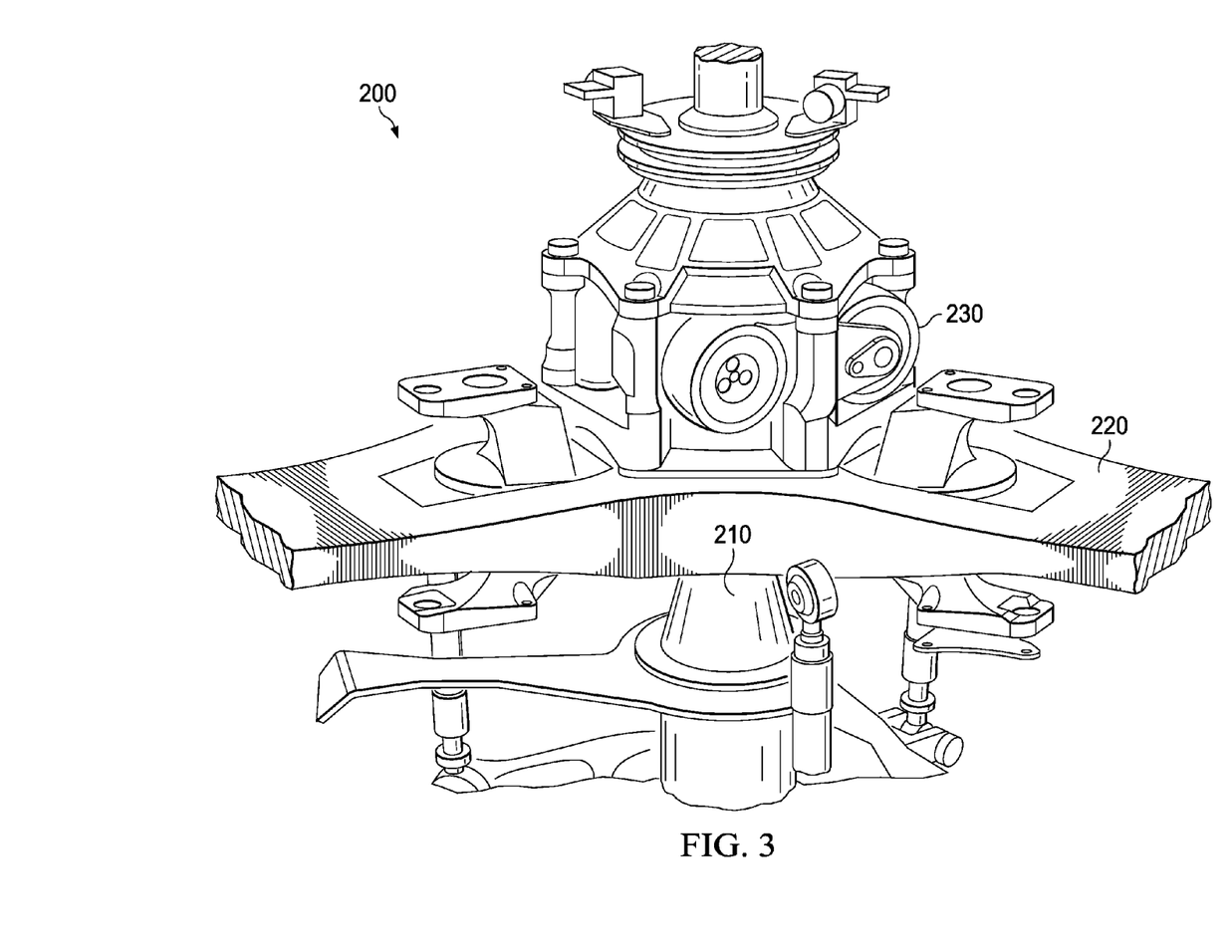
FIG. 3 shows a closer perspective view of a rotor system according to one example embodiment.
Figure 4:
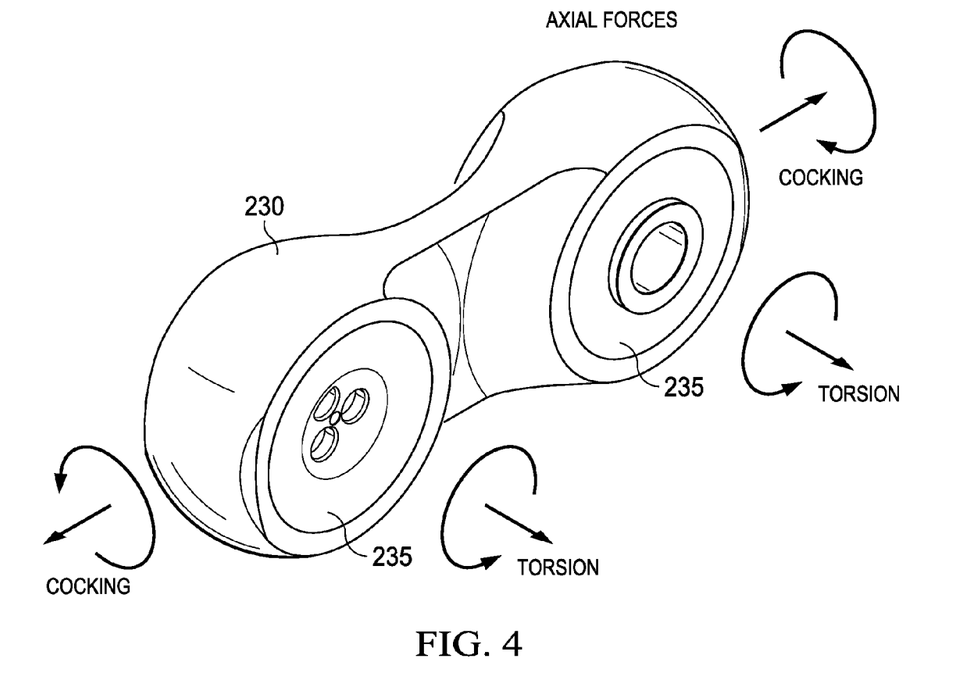
FIG. 4 shows the drive link of the rotor system of FIG. 3 according to one example embodiment.

FIG. 3 shows a perspective view of a rotor system 200 according to one example embodiment. In the example of FIG. 3, rotor system 200 features a powerplant 210, a yoke 220, and drive links 230. In operation, according to one example embodiment, drive links 230 are in mechanical communication with powerplant 210 and yoke 220 and transfers torque from powerplant 210 to yoke 220 while still allowing at least some rotor system flapping of yoke 220 relative to powerplant 210. FIG. 4 shows the drive link of FIG. 3 according to one example embodiment.

In operation, according to one example embodiment, drive link 230 may react to at least three types of forces during flapping of rotor system 200. These three types of motion are shown in greater detail in FIG. 4: axial stretch, cocking, and torsion. In the example of FIG. 4, drive link 230 features elastomeric material 235 that may react to all three motions simultaneously. An elastomeric material is a material, such as a polymer, having the property of viscoelasticity (colloquially, "elasticity"). An example of an elastomeric material is rubber. Elastomeric materials generally have a low Young's modulus and a high yield strain when compared to other materials. Elastomeric materials are typically thermosets having long polymer chains that cross-link during curing (i.e., vulcanizing). Use of elastomeric bearing assemblies in a rotor system such as rotor system 110, however, may create some design issues. For example, using elastomeric materials to react to all three motions shown in FIG. 4 may result in backside tension in the elastomer, large compressive loads, and/or performance concerns during large amounts of flapping. In addition, spherical elastomeric bearings, as shown in the example of FIG. 4, may have limited performance when the bearings are strained in both the torsion and cocking directions, simultaneously.

Accordingly, teachings of certain embodiments recognize the capability to improve drive link performance by decoupling the cocking and torsion motions. Teachings of certain embodiments recognize that decoupling the cocking and torsion motions may increase performance in high-flapping tiltrotor systems as well as other tilting and non-tilting rotor systems.

Figure 5A:
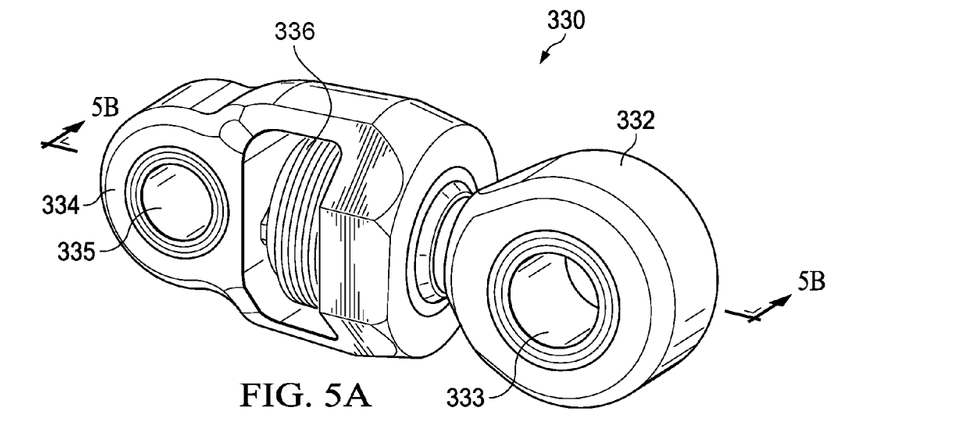
FIG. 5A shows a perspective view of a drive link according to one example embodiment.
Figure 5B:
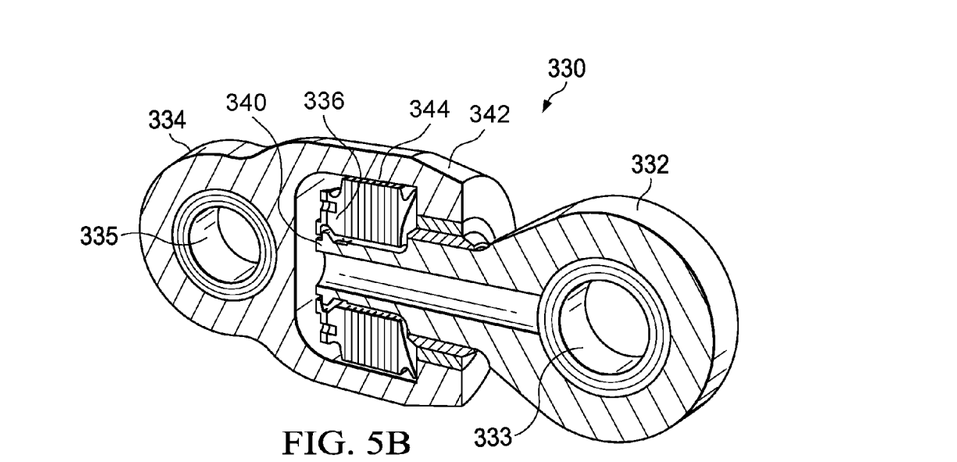
FIG. 5B shows a cross-section view of the drive link of FIG. 5A.
Figure 5C:
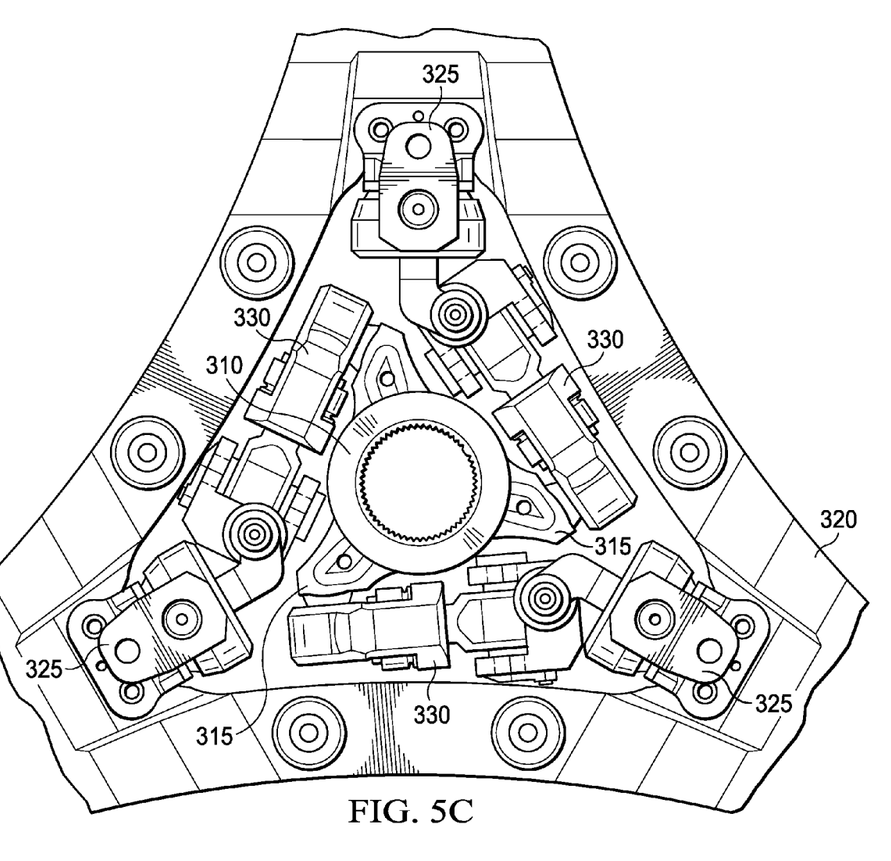
FIG. 5C shows a top view of the drive link of FIG. 5A installed in a rotor system.
Figure 5D:
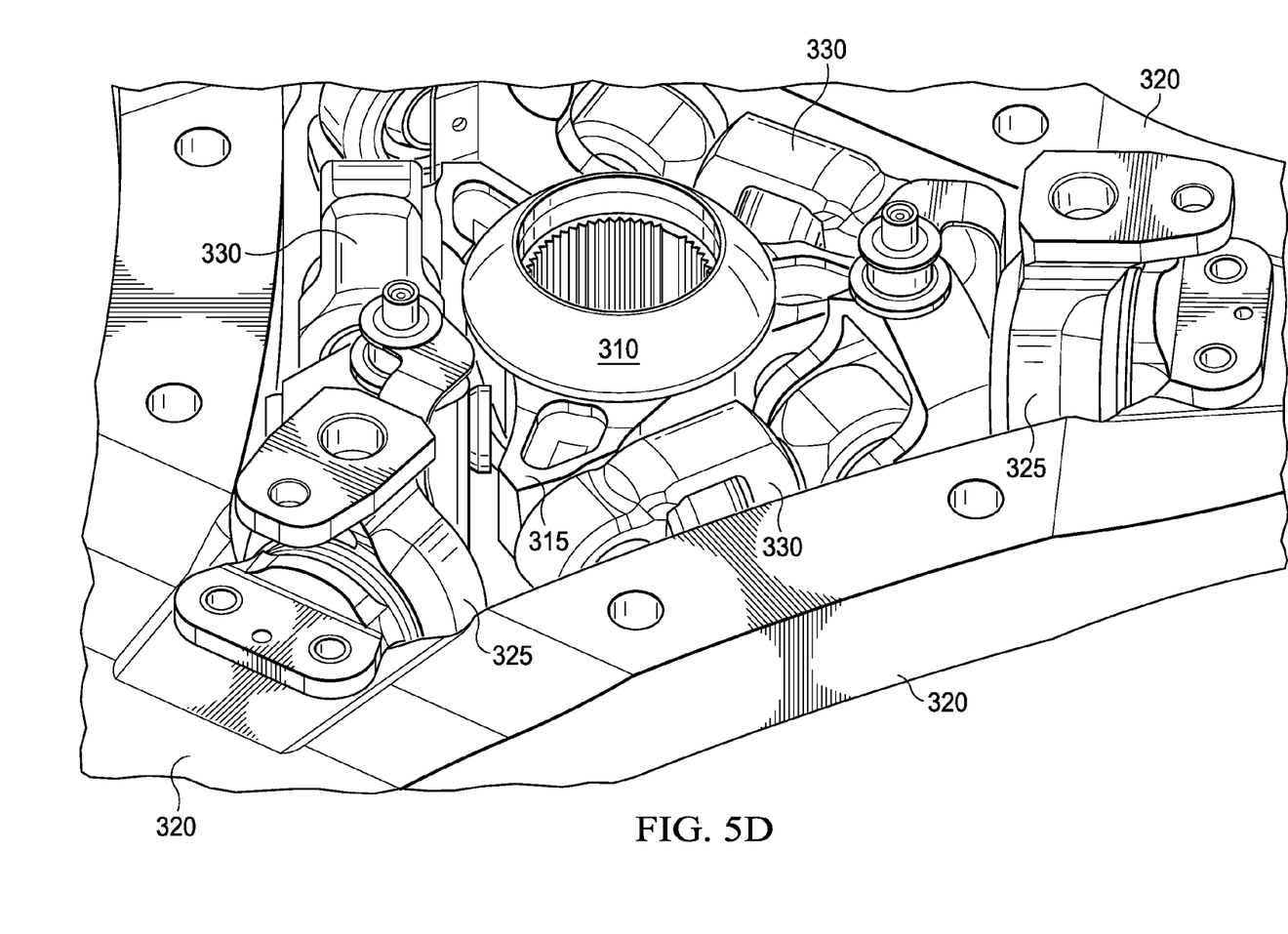
FIG. 5D shows a perspective view of the drive link of FIG. 5A installed in a rotor system.

FIGS. 5A-5D show a drive link 330 according to one example embodiment. FIG. 5A shows a perspective view of drive link 330, FIG. 5B shows a cross-section view of drive link 330, FIG. 5C shows a top view of drive link 330 installed a rotor system 300, and FIG. 5D shows a perspective view of drive link 330 installed in rotor system 300. In operation, according to one example embodiment, drive link 330 receives torque from powerplant 310 via trunions 315 and transfers torque to yoke 320 via drive link couplers 325.

As seen in the example of FIGS. 5A and 5B, drive link 330 features bearing housings 332 and 334. First bearing housing 332 features a first radial bearing 333, and second bearing housing 334 features a second radial bearing 335. In the example of FIGS. 5A and 5B, first and second radial bearings 333 and 335 may represent elastomeric bearings.

Drive link 330 also features a coupling member 336 that couples first bearing housing 332 to second bearing housing 334. In operation, according to one example embodiment, coupling member 336 may allow first bearing housing 332 to move torsionally relative to second bearing housing 334 in response to cocking motions (such as the cocking motions shown in FIG. 4). Radial bearings 333 and 335 may allow for torsion motion relative to their respective bearing housings 332 and 334 in response to torsion motions (such as the torsion motions shown in FIG. 4). In this manner, drive link 330 may decouple the cocking and torsion motions by allowing coupling member 336 to respond to cocking motions and radial bearings 333 and 335 to respond to torsion motions.

Teachings of certain embodiments recognize that decoupling the cocking and torsion motions in drive link 330 may allow the axial stiffness to be engineered to produce the most desirable design. For example, axial may be a leading contributor to oscillatory drive link loads, and reducing axial stiffness may help decrease oscillatory loads during high flapping. Teachings of certain embodiments recognize that providing a separate coupling member 336 to respond to cocking motions may allow radial bearings 333 and 335 to be designed for optimal axial stiffness without needing to respond to cocking motions.

Referring to FIG. 5B, the depicted embodiment includes a central element 340 associated with the first bearing housing 332. A central bearing housing 342 is associated with the second bearing housing 334. The central bearing housing 342 includes an opening 344 configured to receive the central element 342. In the example of FIGS. 5A and 5B, coupling member 336 represents one example of a conical elastomeric bearing, which is disposed between the central element 340 and the central bearing housing 342 in order to accommodate cocking motions (FIG. 4). Teachings of certain embodiments recognize, however, that other coupling members may be used to allow torsion movement between bearing housings 332 and 334. For example, in some embodiments, a standard roller thrust bearing may be used as a center bearing instead of an elastomeric bearing.

In the example of FIGS. 5A and 5B, first bearing housing 332, second bearing housing 334, and coupling member 336 are shown as three separate pieces. Teachings of certain embodiments recognize, however, that drive link 330 may be comprised of more or fewer pieces, and that pieces such as first bearing housing 332, second bearing housing 334, and/or coupling member 336 may be integrated into common components or separated into multiple components.

Figure 6A:
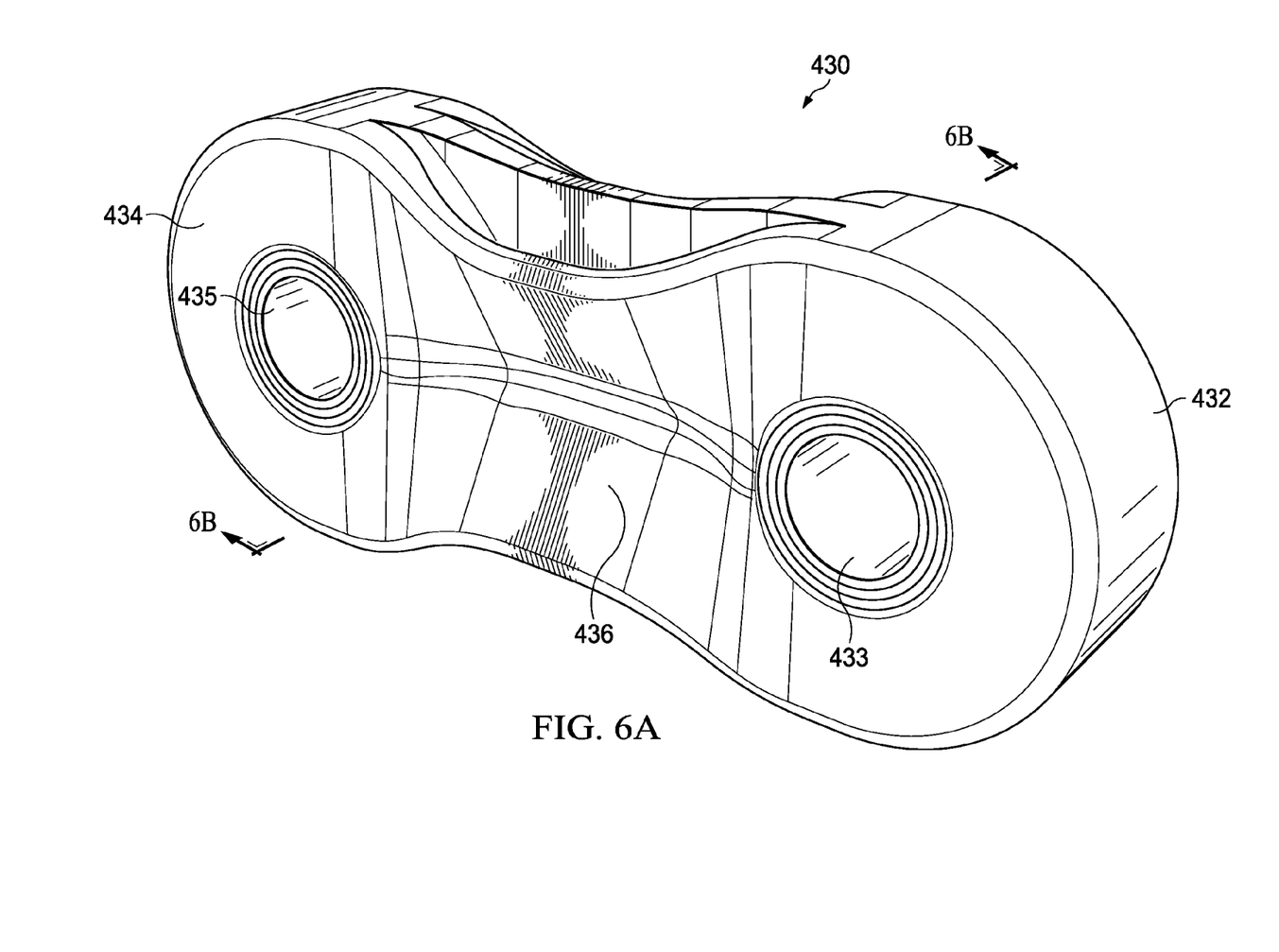
FIG. 6A shows a perspective view of a drive link according to another example embodiment.
Figure 6B:
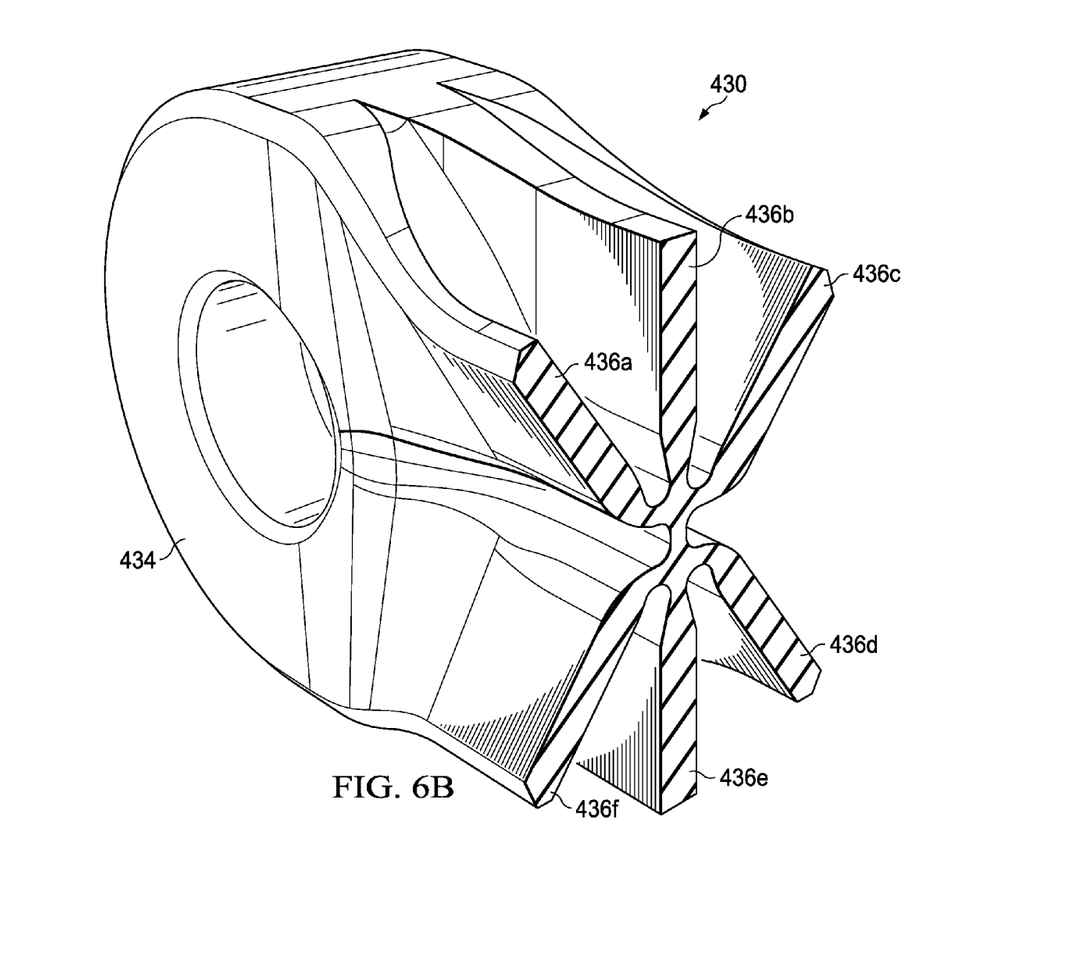
FIG. 6B shows a cross-section view of the drive link of FIG. 6A.
Figure 6C:
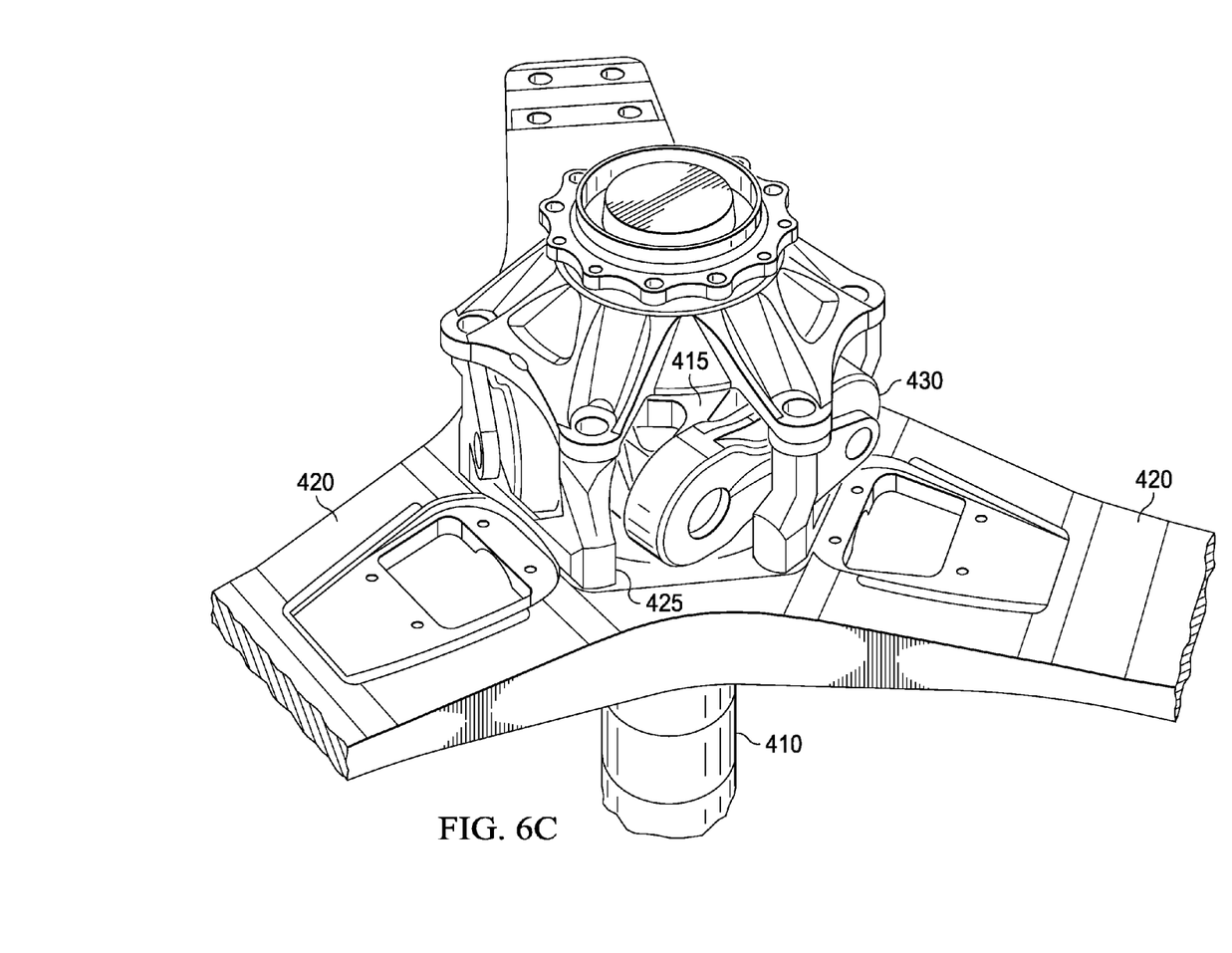
FIG. 6C shows a perspective view of the drive link of FIG. 6A installed in a rotor system.

FIGS. 6A-6C show a drive link 430 according to another example embodiment. FIG. 6A shows a perspective view of drive link 430, FIG. 6B shows a cross-section view of drive link 430, and FIG. 6C shows a perspective view of drive link 430 installed in rotor system 400. In operation, according to one example embodiment, drive link 330 receives torque from powerplant 410 via trunions 415 and transfers torque to yoke 420 via drive link couplers 425.

As seen in the example of FIGS. 6A and 6B, drive link 430 features bearing housings 432 and 434. First bearing housing 432 features a first radial bearing 433, and second bearing housing 434 features a second radial bearing 435. In the example of FIGS. 6A and 6B, first and second radial bearings 433 and 435 may represent elastomeric bearings.

Drive link 430 also features a coupling member 436 that couples first bearing housing 432 to second bearing housing 434. In the example of FIGS. 6A and 6B, first bearing housing 432, second bearing housing 434, and coupling member 436 are shown as a single integrated component. For example, first bearing housing 432, second bearing housing 434, and coupling member 436 may, in combination, represent a composite drive link. Teachings of certain embodiments recognize, however, that drive link 430 may be comprised of more or fewer pieces, and that pieces such as first bearing housing 432, second bearing housing 434, and/or coupling member 436 may be integrated into common components or separated into multiple components.

In operation, according to one example embodiment, coupling member 436 may allow first bearing housing 432 to move torsionally relative to second bearing housing 434 in response to cocking motions (such as the cocking motions shown in FIG. 4). Radial bearings 433 and 435 may allow for torsion motion relative to their respective bearing housings 432 and 434 in response to torsion motions (such as the torsion motions shown in FIG. 4). In this manner, drive link 430 may decouple the cocking and torsion motions by allowing coupling member 436 to respond to cocking motions and radial bearings 433 and 435 to respond to torsion motions.

In the example of FIGS. 6A and 6B, coupling member 436 represents one example of a flex beam. A flex beam is a structural arrangement that allows at least some twisting such that first bearing housing 432 may move torsionally relative to second bearing housing 434 in response to cocking motions.

In the example of FIGS. 6A and 6B, the coupling member 436 is shown in a "chicken foot" arrangement. In this example embodiment, the coupling member 436 comprises six flanges 436a-436f.

In some embodiments, each flange 436a-436f may include unidirectional belts and bias packs situated between the unidirectional belts. In one example embodiment, the unidirectional belts are constructed of unidirectional fiberglass material whose fibers are parallel to the spanwise axis, thereby providing high tensile strength. In this example embodiment, the bias pack may be constructed of four plies of +/−45 degree fiberglass material ("bias material"), that is, material whose fibers are at an angle of plus or minus 45 degrees relative to the spanwise axis. A thin cover of woven fiberglass material may cover one or more of the flanges in an effort to prevent or localize spanwise cracks in the unidirectional belts.

In some embodiments, flanges 436a-436f may decrease in thickness toward the intersections of the flanges 436a-436f and the web so that only the bias packs meet at the intersections. In addition, the bias packs of flanges 436b and 436e may intersect the web at an angle of zero degrees, and the bias packs of flanges 436a, 436c, 436d, and 436f may intersect the web as close as practical to an angle of 90 degrees. As a result of the decreased thickness of the flanges 436a-436f at the intersections and the angles at which the flanges 436a-436f intersect the web, the size of the circles that can be inscribed in the intersections may be minimized, thus minimizing the intersection shear stress developed when the coupling member 436 is twisted.

As stated above, example embodiments of the bias packs of flanges 436a and 436f are constructed of four continuous plies of bias material. The same may be true for the bias packs of flanges 436b and 436e and for those of flanges 436c and 436d. The bias packs of all the flanges 436a-436f form a web. Thus, the web may include twelve plies of bias material. Teachings of certain embodiments recognize that the bias packs may provide an efficient means for reacting the shear stress which results from twisting the coupling member 436.

In some embodiments, a thin flange that emanates radially from the neutral feathering axis of the coupling member 436 may offer little resistance to twisting and develop minimum stress when twisted. In the example of FIGS. 5A and 5B, flanges 436b and 436e are radial, while flanges 436a, 436c, 436d, and 436f are only approximately radial. While flanges 436a, 436c, 436d, and 436f being only approximately radial may increase the torsional rigidity of the coupling member 436 and the shear stress developed when the coupling member 436 is twisted, those increases may be minimal, and the configuration shown may provide the appropriate flapping bending rigidity.

Teachings of certain embodiments recognize that, for a given amount of flange material and a given cross-sectional flange width, the greater the number of flanges, the thinner the flanges can be. However, if a flange is too thin, it can buckle when bent edgewise. Increasing the number of flanges that meet at an intersection may increase the size of the circle that can be inscribed in the intersection, which may result in an increase in the intersection shear stress. The increased intersection shear stress, in combination with the other shear stresses to which the intersection may be subjected, can exceed the shear strength of the intersection material, resulting in failure of the flexure at the intersection.

Therefore, teachings of certain embodiments recognize the capability to provide more than one intersection, thereby decreasing the intersection shear stress at each intersection.

As mentioned above, the unidirectional belts may be constructed of unidirectional fiberglass material. In one example embodiment, each belt is laid up using thin, ⅛-inch wide, unidirectional fiberglass tape. Alternatively, any convenient width tape or a single glass fiber may be used. Although, this example embodiment is constructed of fiberglass, teachings of certain embodiments recognize that other high-strength fibers, such as carbon or boron, may be used.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A tiltrotor aircraft, comprising:
   a body;
   a wing member;
   a power train coupled to the body and comprising a power source and a drive shaft in mechanical communication with the power source; and
   a rotor system coupled to the wing member and in mechanical communication with the drive shaft, at least part of the rotor system being tiltable between a helicopter mode position and an airplane mode position, the rotor system comprising:
      a first drive element in mechanical communication with the drive shaft;
      a yoke disposed at least partially about the drive shaft;
      a second drive element in mechanical communication with the yoke;
      a rotor blade coupled to the yoke; and
      a drive link coupled between the drive shaft and the yoke, the drive link comprising:
         a first bearing housing defining an opening therethrough configured to receive the first drive element;
         a first radial bearing disposed between an inner surface of the opening of the first bearing housing and an outer surface of the first drive element;
         a second bearing housing defining an opening therethrough configured to receive the second drive element;
         a second radial bearing disposed between an inner surface of the opening of the second bearing housing and an outer surface of the second drive element; and
         a central portion coupled between the first bearing housing and the second bearing housing, the central portion including a central radial bearing configured such that the central portion twists in response to cocking of the first bearing housing relative to the second bearing housing.

2. The tiltrotor aircraft of claim 1, wherein:
   the first bearing housing, the opening of the first bearing housing, the second bearing housing, the opening of the second bearing housing, and the central portion are coaxial along a drive link axis; and
   the central radial bearing defines a bearing axis that is substantially parallel to the drive link axis.

3. The tiltrotor aircraft of claim 2, wherein the central portion has less torsional stiffness relative to the drive link axis than the first and second radial bearings.

4. The tiltrotor aircraft of claim 1, the central portion comprising:
   a central element in mechanical communication with the first bearing housing;
   a central bearing housing in mechanical communication with the second bearing housing, the central bearing housing defining an opening therethrough configured to receive the central element; and
   the central radial bearing disposed between an inner surface of the opening of the central bearing housing and an outer surface of the central element.

5. The tiltrotor aircraft of claim 1, the central radial bearing comprising an elastomeric bearing.

6. The tiltrotor aircraft of claim 1, the central radial bearing comprising a roller thrust bearing.

7. The tiltrotor aircraft of claim 1, wherein:
   the first radial bearing defines a first bearing axis; and
   the central radial bearing defines a central bearing axis that is substantially perpendicular to the first bearing axis.

8. A method of transmitting torque from a drive shaft to a rotor yoke, the method comprising:
   providing a drive link;
   receiving, at a first bearing housing opening of the drive link, a first drive element in mechanical communication with the drive shaft;
   wherein the drive link comprises a first radial bearing disposed between an inner surface of the opening of the first bearing housing and an outer surface of the first drive element;
   receiving, at a second housing opening of the drive link, a second drive element in mechanical communication with the rotor yoke;
   wherein the drive link comprises a second radial bearing disposed between an inner surface of the opening of the second bearing housing and an outer surface of the second drive element;
   wherein the drive link comprises a central portion coupled between the first and second bearing housing, the central portion including a central radial bearing; and
   allowing twisting of the central portion about the central radial bearing in response to cocking of the first bearing housing relative to the second bearing housing.

9. The method of claim 8, the central portion comprising:
   a central element in mechanical communication with the first bearing housing;
   a central bearing housing in mechanical communication with the second bearing housing, the central bearing housing defining an opening therethrough configured to receive the central element; and
   the central radial bearing disposed between an inner surface of the opening of the central bearing housing and an outer surface of the central element.

10. The method of claim 8, the central radial bearing comprising an elastomeric bearing.

11. The method of claim 8, the central radial bearing comprising a roller thrust bearing.

12. A drive link, comprising:
   a first bearing housing defining an opening therethrough configured to receive a first drive element;
   a first radial bearing disposed between an inner surface of the opening of the first bearing housing and an outer surface of the first drive element;
   a second bearing housing defining an opening therethrough configured to receive a second drive element;
   a second radial bearing disposed between an inner surface of the opening of the second bearing housing and an outer surface of the second drive element; and
   a central portion coupled between the first bearing housing and the second bearing housing, the central portion including a central radial bearing configured such that the central portion twists in response to cocking of the first bearing housing relative to the second bearing housing.

13. The drive link of claim 12, wherein:
   the first bearing housing, the opening of the first bearing housing, the second bearing housing, the opening of the second bearing housing, and the central portion are coaxial along a drive link axis; and
   the central radial bearing defines a bearing axis that is substantially parallel to the drive link axis.

14. The drive link of claim 13, wherein the central portion has less torsional stiffness relative to the drive link axis than the first and second radial bearings.

15. The drive link of claim 12, the central portion comprising:
   a central element in mechanical communication with the first bearing housing;
   a central bearing housing in mechanical communication with the second bearing housing, the central bearing housing defining an opening therethrough configured to receive the central element; and
   the central radial bearing disposed between an inner surface of the opening of the central bearing housing and an outer surface of the central element.

16. The drive link of claim 12, the central radial bearing comprising an elastomeric bearing.

17. The drive link of claim 12, the central radial bearing comprising a roller thrust bearing.

18. The drive link of claim 12, wherein:
   the first radial bearing defines a first bearing axis; and
   the central radial bearing defines a central bearing axis that is substantially perpendicular to the first bearing axis.

* * * * *